(12) United States Patent
Liang

(10) Patent No.: US 8,363,036 B2
(45) Date of Patent: *Jan. 29, 2013

(54) STYLUS RETAINING MECHANISM FOR PORTABLE ELECTRONIC DEVICE

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 297 days.

This patent is subject to a terminal disclaimer.

(21) Appl. No.: 12/869,868

(22) Filed: Aug. 27, 2010

(65) Prior Publication Data

US 2011/0310065 A1 Dec. 22, 2011

(30) Foreign Application Priority Data

Jun. 21, 2010 (CN) ...................... 2010 2 0230980 U

(51) Int. Cl.
*G06F 3/033* (2006.01)
*G06F 3/041* (2006.01)
*G06K 11/06* (2006.01)
*G08C 21/00* (2006.01)

(52) U.S. Cl. ................. 345/179; 178/19.01; 361/679.01

(58) Field of Classification Search ............ 369/679.01–679.61; 221/264–272; 222/336, 361, 243, 511; 178/19.01–19.05
See application file for complete search history.

(56) References Cited

U.S. PATENT DOCUMENTS

2003/0184529 A1* 10/2003 Chien et al. .................. 345/179
2007/0285227 A1* 12/2007 Timothy et al. .......... 340/539.13
2008/0011773 A1* 1/2008 Tobias .......................... 221/264

* cited by examiner

*Primary Examiner* — Joe H Cheng
*Assistant Examiner* — Nathan Brittingham
(74) *Attorney, Agent, or Firm* — Altis Law Group, Inc.

(57) ABSTRACT

A stylus retaining mechanism for portable electronic device includes a housing and a locking assembly. The housing includes a fixing portion, an opening and a receiving chamber communicating with the opening. The receiving chamber is configured to receive a stylus, the housing included. The locking assembly is attached to the fixing portion, and includes a button and an elastic member. The button defines a passage to allow the stylus to extend through and slide along a landscape orientation of the stylus. A protrusion is formed in the passage. The stylus is locked in the stylus retaining mechanism by engagement between the latching portion and the protrusion. The latching portion is disengaged from the protrusion when the button is depressed.

14 Claims, 5 Drawing Sheets

STYLUS RETAINING MECHANISM FOR PORTABLE ELECTRONIC DEVICE

This application is related to co-pending U.S. patent application Ser. No. 12/869,886, all entitled "STYLUS RETAINING MECHANISM FOR PORTABLE ELECTRONIC DEVICE". Such applications have the same assignee as the present application. The above-identified applications are incorporated herein by reference.

BACKGROUND

1. Technical Field

The exemplary disclosure generally relates to a stylus retaining mechanism, and, particularly, to a stylus retaining mechanism used in a portable electronic device.

2. Description of Related Art

Many portable electronic devices, such as palmtop computers, hand-held computers, laptop computers, mobile phones and personal digital assistants (PDAs), include a stylus or a touch pen. This can be utilized to input information into the electronic device, to select menu options or otherwise navigate through touch control graphical user interfaces of an operating system or the current software. Generally, the stylus is stored inside a housing of the portable electronic device. A stylus retaining mechanism is used to retain the stylus. A conventional stylus retaining mechanism includes a hook to lock the stylus. However, the hook can lock the stylus too tightly and it can be hard to remove for use.

Therefore, there is room for improvement within the art.

BRIEF DESCRIPTION OF THE DRAWINGS

Many aspects of the stylus retaining mechanism can be better understood with reference to the following drawings. The components in the drawings are not necessarily drawn to scale, the emphasis instead being placed upon clearly illustrating the principles of the stylus retaining mechanism.

DETAILED DESCRIPTION

Figure 1:
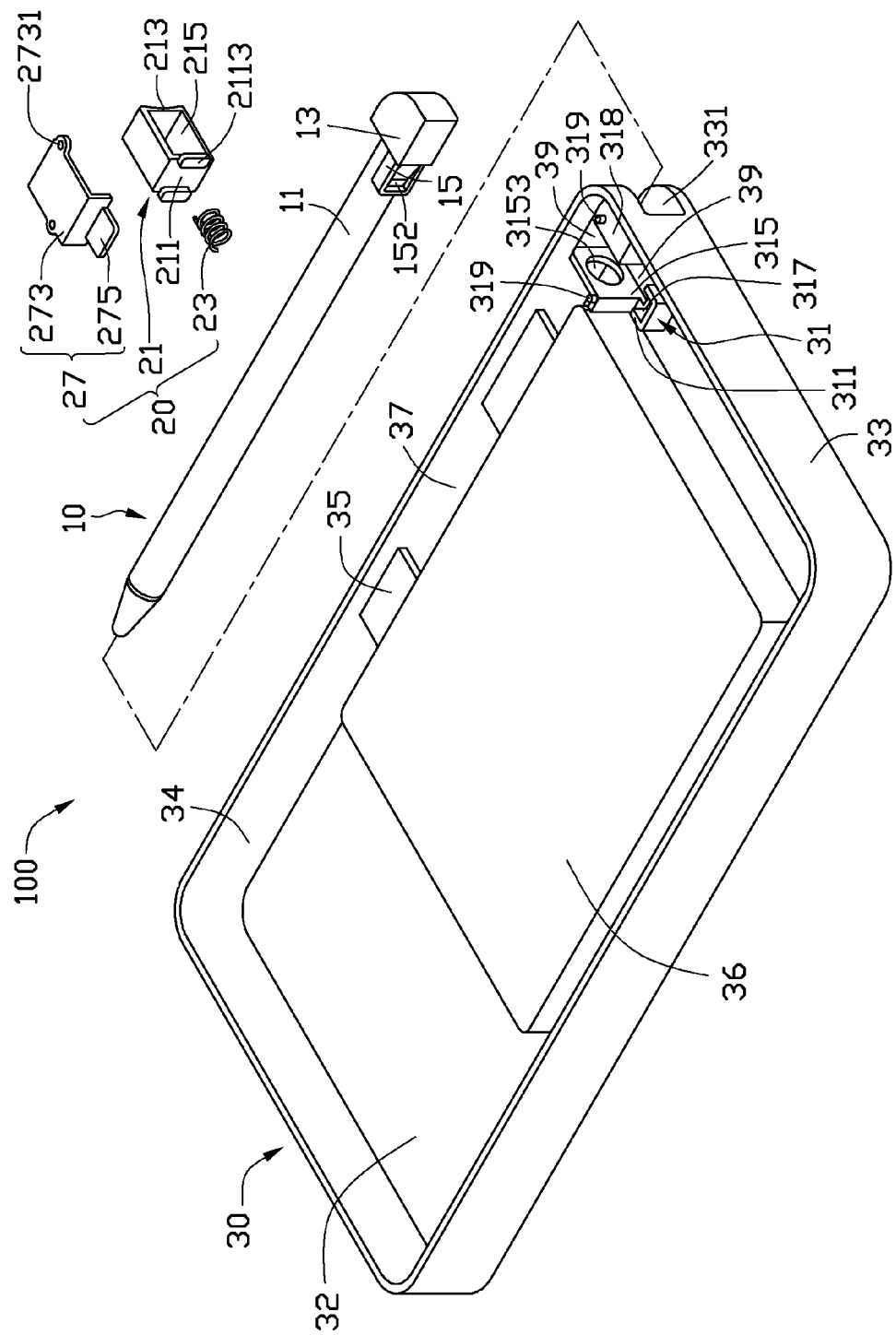
FIG. 1 is an exploded, isometric view of a stylus retaining mechanism with a stylus, in accordance with an exemplary embodiment.

FIG. 1 shows an exemplary embodiment of a stylus retaining mechanism 100 applied to a portable electronic device (not labeled) for retaining a stylus 10.

The stylus 10 includes a body portion 11 and a head portion 13 at one end of the body portion 11. A latching portion 15 is formed on the body portion 11 adjacent to the head portion 13. The latching portion 15 defines a latching groove 152.

The stylus retaining mechanism 100 includes a housing 30 and a locking assembly 20. The housing 30 includes a bottom plate 32, an end wall 33 and a sidewall 34. A block 36 is formed on the bottom plate 32 spaced from the sidewall 34. At least one top plate 35 connects the block 36 and the sidewall 34. The bottom plate 32, the sidewall 34, the end wall 33, the block 36 and the top plate 35 cooperatively define a receiving chamber 37 for receiving the stylus 10. The end wall 33 defines an opening 331 communicating with the receiving chamber 37. The opening 331 allows the stylus 10 to be inserted into the receiving chamber 37. A fixing portion 31 is formed on a corner of the block 26 adjacent to the opening 331. The fixing portion 31 includes a frame 311, a separating board 315 and a stage 318. The frame 311 defines a slot 317. The separating board 315 connects the block 36 to the sidewall 34. The separating board 315 defines a round hole 3153 allowing the stylus 10 to extend through. The stage 318 extends from the end wall 33, and the opening 331 is through the stage 318 A space 39 is formed between the separating board 315 and the stage 318, communicating with the receiving chamber 37. Each of the separating board 315 and the stage 318 has a pin 319 on a top surface (not labeled) thereof.

Figure 2:
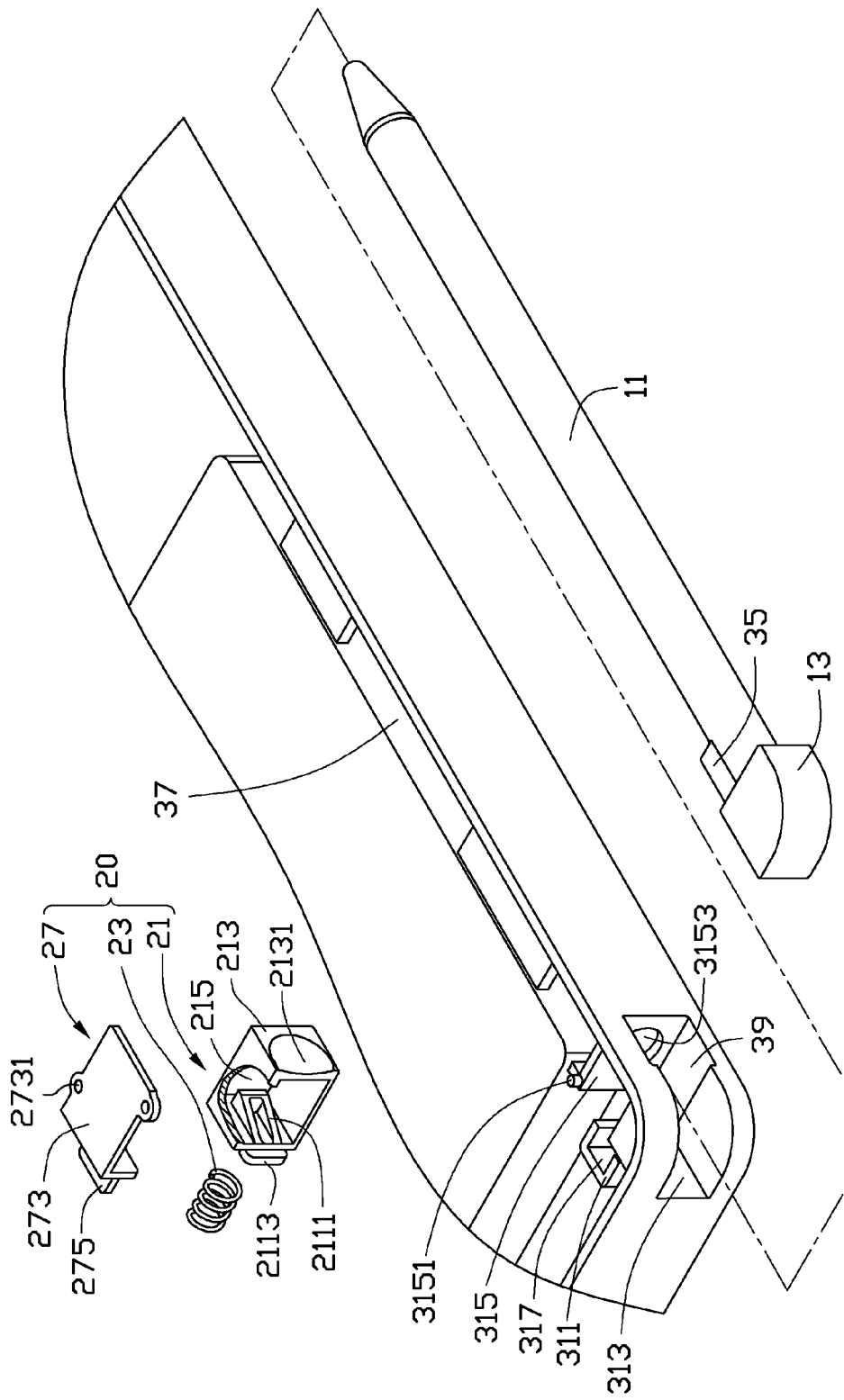
FIG. 2 is similar to FIG. 1, but partially shown from another aspect.

Also referring to FIG. 2, the locking assembly 20 includes a button 21, a spring 23 and a fixing member 27. The button 21 is a hollow box, and includes an operating surface 213 and a bottom wall 211 at two ends thereof. The operating surface 213 is partially recessed to form a depression 2131 for easy operation. A passage 215 is defined between the operating surface 213 and the bottom wall 211 allowing the stylus 10 to extend through and slide along a landscape orientation of the stylus 10. Two stopper portions 2113 extend from two ends of the bottom wall 211 at one side A protrusion 2111 is formed at another side of the bottom wall 211 in the passage 215. In this embodiment, the protrusion 2111 is wedge-shaped.

The fixing member 27 includes a bent portion 273 and an extending portion 275 extending from a distal end of the bent portion 273. The bent portion 273 defines two pin holes 2731 corresponding to the pins 319.

Figure 3:
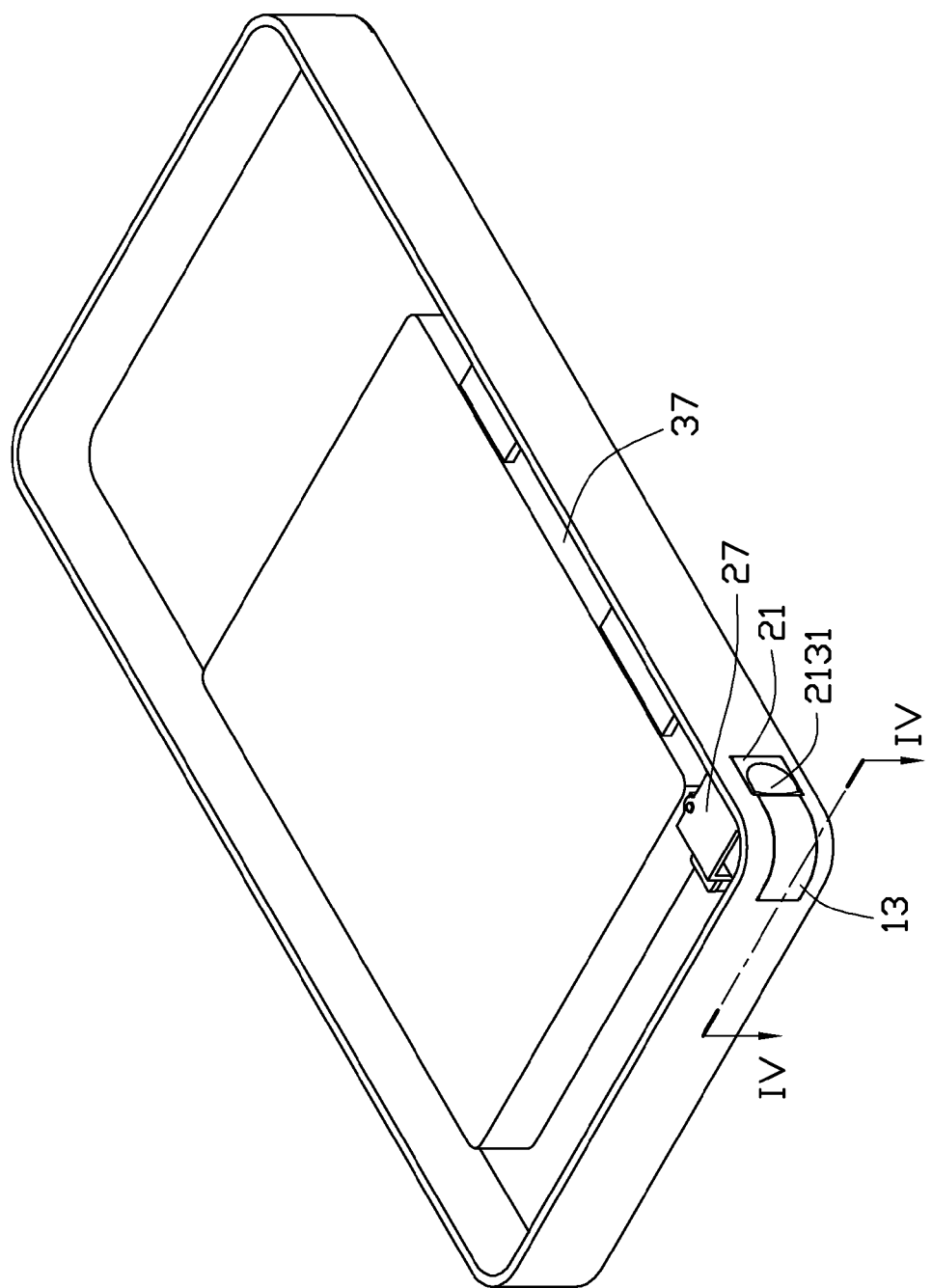
FIG. 3 is an assembled, isometric view of the stylus retaining mechanism shown in FIG. 1.
Figure 4:
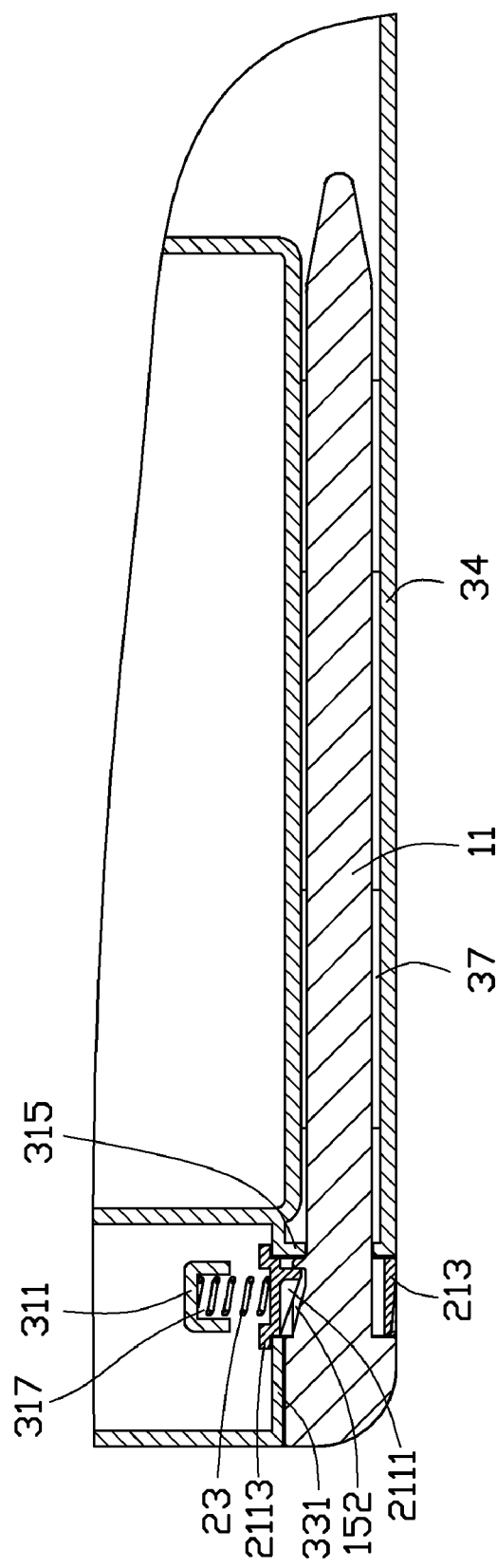
FIG. 4 is a partially cross-sectional view of the stylus retaining mechanism of FIG. 3 taken along line IV-IV.
Figure 5:
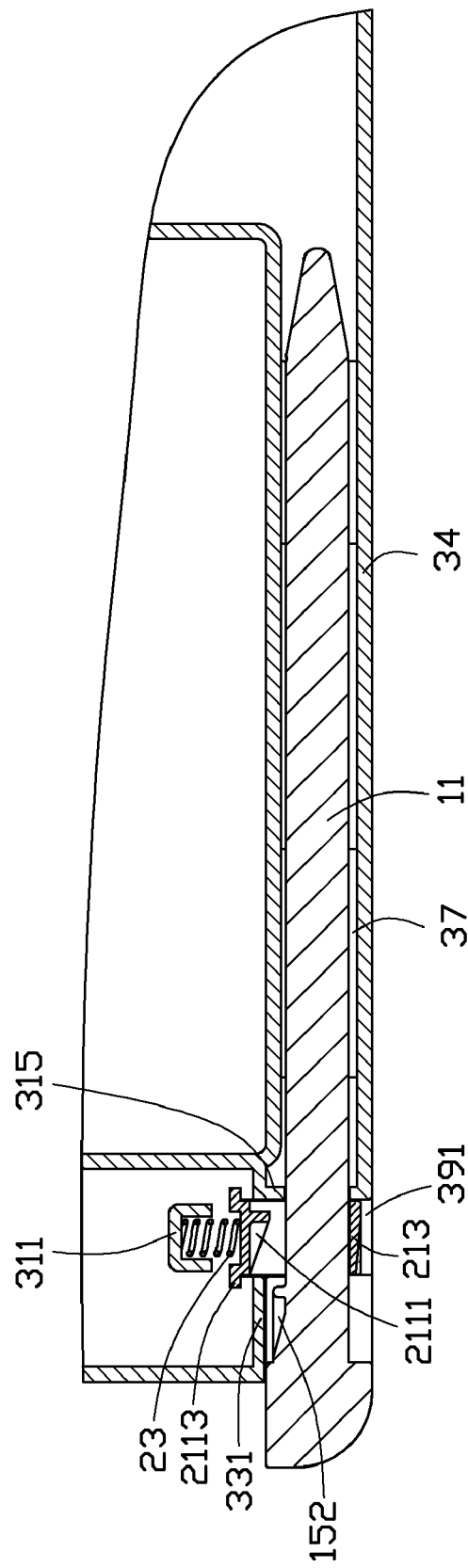
FIG. 5 is similar to FIG. 4, but showing the stylus is disengaged from a locking assembly of the stylus retaining mechanism.

Also referring to FIGS. 3 and 4, to attach the locking assembly 20 to the housing 30, the button 21 is positioned in the space 39 between the separating board 315 and the stage 318. One end of the spring 23 is received in the slot 317, and the other end abuts the bottom wall 211 between the two stopper portions 2113. The fixing member 27 is fixed to the fixing portion 31 by engagement between the pins 319 and the pin holes 2731. The bent portion 273 covers the button 21, and the extending portion 275 covers the slot 317. Thus, the bent portion 273 and the extending portion 275 can respectively prevent the button 21 and the spring 23 from separating from the housing 30.

To attach the stylus 10 to the stylus retaining mechanism 100, the stylus 10 is inserted into the receiving chamber 37 through the opening 331. The latching portion 15 contacts the protrusion 2111 snapping into a secure position. At the same time, the spring 23 is compressed. When the latching portion 15 of the stylus 10 passes the protrusion 2111, the spring 23 provides a decompressing force against the button 21 to return to original position. The separating board 315 and the stage 318 stop the stopper portions 2113 from moving further, which prevents the button 21 from separating from the fixing portion 31 when the button 21 is pushed to return to its original position. Thus, the stylus 10 is locked in the receiving chamber 37 with an engagement between the latching portion 15 and the protrusion 2111, with the head portion 13 received in the opening 331.

To detach the stylus 10 from the stylus retaining mechanism 100, the button 21 is depressed, and the latching portion 15 is disengaged from the protrusion 2111. At the same time, the spring 23 is compressed. The head portion 13 is then pushed out from the opening 331 through the operating surface 213. Thus, the stylus 10 can be removed from the stylus retaining mechanism 100. The button 21 is pushed to return to an original position by a decompressing force of the spring 23 when the stylus 10 is removed from the stylus retaining mechanism 100.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stylus retaining mechanism for retaining a stylus, the stylus including a latching portion, the stylus retaining mechanism comprising:
 a housing defining an opening and a receiving chamber communicating with the opening, the receiving chamber configured to receive the stylus, the housing including a fixing portion, the fixing portion including a frame defining a slot; and
 a locking assembly attached to the fixing portion, the locking assembly including a button and an elastic member; a first end of the elastic member received in the slot, and a second end of the elastic member resisting the button; the button being a hollow box defining a passage to allow the stylus to extend through, the button including a wedge-shaped protrusion in the passage, the protrusion releasably latching the latching portion to retain the stylus.

2. The stylus retaining mechanism as claimed in claim 1, wherein the fixing portion is positioned adjacent to the opening, and the frame is U-shaped.

3. The stylus retaining mechanism as claimed in claim 2, wherein the fixing portion comprises a separating board and a stage, and the button is positioned between the separating board and the stage.

4. The stylus retaining mechanism as claimed in claim 3, wherein the locking assembly further comprises a fixing member, and the fixing member is mounted to the separating board and the stage to prevent the elastic member and the button from separating from the housing.

5. The stylus retaining mechanism as claimed in claim 4, wherein the fixing member comprises a bent portion and an extending portion, the bent portion is positioned on the separating board and the stage for covering the button, and the extending portion is positioned on the frame for covering the slot.

6. The stylus retaining mechanism as claimed in claim 3, wherein the button comprises a bottom wall, the protrusion is formed at one side of the bottom wall, two clasping portions are formed on another side opposite to the protrusion, the second end of the elastic member abuts between the clasping portions.

7. The stylus retaining mechanism as claimed in claim 6, wherein the separating board defines a round hole allowing the stylus to extend through, and the opening is through the stage.

8. The stylus retaining mechanism as claimed in claim 6, wherein the button comprises an operating surface opposite to the bottom wall, the operating surface is partially recessed for easy operation.

9. A portable electronic device comprising:
 a stylus including a latching portion;
 a housing defining an opening and a receiving chamber, the receiving chamber communicating with the opening, the receiving chamber configured for receiving the stylus, the housing including a fixing portion, the fixing portion including a frame defining a slot; and
 a locking assembly attached to the fixing portion, the locking assembly including a button and an elastic member; the button being a hollow box defining a passage to allow the stylus to extend through and slide along a landscape orientation of the stylus; a wedge-shaped protrusion formed in the passage, the stylus locked in the stylus retaining mechanism by engagement between the latching portion and the protrusion, the latching portion disengaged from the protrusion when the button is depressed, and the elastic member providing a decompressing force against the button to return the button to its original position.

10. The stylus retaining mechanism as claimed in claim 9, wherein the fixing portion is positioned adjacent to the opening, and the frame is U-shaped.

11. The stylus retaining mechanism as claimed in claim 10, wherein the fixing portion comprises a separating board and a stage, and the button is positioned between the separating board and the stage.

12. The stylus retaining mechanism as claimed in claim 11 wherein the locking assembly further comprises a fixing member, and the fixing member is mounted to the separating board and the stage to prevent the elastic member and the button from separating from the housing.

13. The stylus retaining mechanism as claimed in claim 12, wherein the fixing member comprises a bent portion and an extending portion, the bent portion is positioned on the separating board and the stage for covering the button, and the extending portion is positioned on the frame for covering the slot.

14. The stylus retaining mechanism as claimed in claim 9, wherein the button comprises a first plate, a second plate, a bottom wall, and an operating surface connected to each other, the first plate abuts against the housing, the second plate abuts against the fixing member, the bottom wall faces with the operating surface, the protrusion is formed at one side of the bottom wall, two clasping portions are formed on another side opposite to the protrusion, a first end of the elastic member is received in the slot, and a second end of the elastic member abuts between the clasping portions.

* * * * *